(12) United States Patent
Mitchell et al.

(10) Patent No.: US 9,491,587 B2
(45) Date of Patent: Nov. 8, 2016

(54) SPATIALLY MAPPING RADIO FREQUENCY DATA IN 3-DIMENSIONAL ENVIRONMENTS

(71) Applicant: The Boeing Company, Chicago, IL (US)

(72) Inventors: Bradley J. Mitchell, Snohomish, WA (US); Paul Murray, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/660,867

(22) Filed: Mar. 17, 2015

(65) Prior Publication Data

US 2016/0277901 A1 Sep. 22, 2016

(51) Int. Cl.
| | | |
|---|---|---|
| *H04W 24/00* | (2009.01) | |
| *H04W 4/04* | (2009.01) | |
| *H04W 72/08* | (2009.01) | |
| *H04W 24/08* | (2009.01) | |
| *H04W 24/04* | (2009.01) | |
| *H04L 12/04* | (2006.01) | |

(52) U.S. Cl.
CPC .............. *H04W 4/043* (2013.01); *H04L 12/04* (2013.01); *H04W 24/04* (2013.01); *H04W 24/08* (2013.01); *H04W 72/085* (2013.01)

(58) Field of Classification Search
CPC . H04W 4/043; H04W 72/085; H04W 24/08; H04W 24/04; H04L 12/04
USPC ............. 455/456.1, 456.3, 513, 509
See application file for complete search history.

(56) References Cited

U.S. PATENT DOCUMENTS

| | | | |
|---|---|---|---|
| 6,046,698 A | 4/2000 | Pandey | |
| 8,989,053 B1 * | 3/2015 | Skaaksrud | H04W 12/06 370/255 |
| 2008/0131029 A1 * | 6/2008 | Coleby | G01C 11/00 382/300 |
| 2011/0252131 A1 * | 10/2011 | Karaoguz | H04L 41/12 709/224 |
| 2011/0260922 A1 | 10/2011 | Zhang et al. | |
| 2012/0150573 A1 * | 6/2012 | Soubra | G06Q 10/06 705/7.11 |
| 2015/0132774 A1 | 5/2015 | Lin et al. | |
| 2015/0181390 A1 * | 6/2015 | Williams | G06Q 10/10 455/456.3 |
| 2015/0334676 A1 * | 11/2015 | Hart | H04W 64/00 455/456.1 |

FOREIGN PATENT DOCUMENTS

| | | |
|---|---|---|
| CN | 105282764 A | 1/2016 |
| KR | 20140012573 A | 2/2014 |
| KR | 20150124535 A | 11/2015 |

OTHER PUBLICATIONS

Combined Search and Examination Report, Aug. 24, 2016, Application No. GB1604169.1.

* cited by examiner

*Primary Examiner* — Khai M Nguyen
(74) *Attorney, Agent, or Firm* — Duft Bornsen & Fettig LLP (57) ABSTRACT

Embodiments described herein provide for the generation of 3-D RF performance maps of an environment by correlating RF performance data generated from known locations within the environment with spatial data generated of the environment. One embodiment comprises an apparatus that generates spatial data of an environment in a 3-D coordinate system. The apparatus generates RF performance data for an RF transmitter that is located within the environment. The apparatus identifies 3-D locations of the apparatus within the environment based on the spatial data, identifies RF performance values for the RF transmitter at the 3-D locations based on the RF performance data, and generates a 3-D RF performance map of the environment based on the 3-D locations and the RF performance values.

22 Claims, 4 Drawing Sheets

SPATIALLY MAPPING RADIO FREQUENCY DATA IN 3-DIMENSIONAL ENVIRONMENTS

FIELD

This disclosure relates to the field of 3-Dimensional (3D) mapping systems, and in particular, to mapping systems that generate spatial data of environments.

BACKGROUND

When creating Radio Frequency (RF) networks within indoor environments (e.g., an aircraft environment), it is desirable to understand the physical extent over which RF receivers and transmitters are capable of reliably communicating with each other. This extent can be based upon the physical layout of the environment and/or the materials that make up the environment. For instance, a metal fuselage of an aircraft along with the various materials used within the fuselage can form a challenging environment for reliably creating RF networks due to multi-path issues, RF absorptive materials, etc.

In some cases, RF modeling can be used to infer the RF propagation within the environment, but modelling depends highly on the geometry of the environment and the RF characteristics of the materials used within the environment. Unfortunately, the RF characteristics of the environment may be poorly understood. Further, RF models may also poorly represent the potential multi-path propagation issues that are common within the metal fuselage of an aircraft.

While it may be possible to place testing equipment at various locations within the environment to capture RF information about the environment, this practice is time consuming and is limited in sample size. Further, this type of manual approach may miss possible communication issues that exist in the environment, since it would be impractical to test every conceivable physical location within a complex environment in a reasonable amount of time.

SUMMARY

Embodiments described herein provide for the generation of 3-D RF performance maps of an environment by correlating RF performance data generated from known locations within the environment with spatial data generated of the environment. The RF performance data and the spatial data may be generated substantially simultaneously, which allows for rapid and efficient identification of any RF communication issues that may exist in the environment. For example, an RF receiver may be mounted proximate to a scanner (e.g., a Light Detection and Ranging (LiDAR) scanner) and carried through an environment to capture both RF performance data (e.g., Received Signal Strength Indicator (RSSI) data) and spatial data. The RF performance data may then be mapped to the spatial data to generate 3-D RF performance maps of the environment. Utilizing the 3-D RF performance map, it may be possible to quickly identify possible RF communication issues that may exist in the environment.

One embodiment comprises an apparatus that includes a scanner that generates spatial data of an environment in a 3-D coordinate system. The apparatus further includes an RF receiver located proximate to the scanner that generates RF performance data for an RF transmitter that is located within the environment. The apparatus further includes a controller that identifies 3-D locations of the scanner within the environment based on the spatial data, identifies RF performance values for the RF transmitter at the 3-D locations based on the RF performance data, and generates a 3-D RF performance map of the environment based on the 3-D locations and the RF performance values.

Another embodiment comprises a method of mapping RF performance data for a transmitter located within a 3-D environment to spatial data for the 3-D environment. The method comprises generating, by a scanner, spatial data of an environment in a 3-D coordinate system. The method further comprises generating, by an RF receiver located proximate to the scanner, RF performance data for an RF transmitter located within the environment. The method further comprises identifying 3-D locations of the scanner within the environment based on the spatial data, and identifying RF performance values for the RF transmitter at the 3-D locations based on the RF performance data. The method further comprises generating a 3-D RF performance map of the environment based on the 3-D locations and the RF performance values.

Another embodiment comprises a LiDAR scanner that generates time-stamped 3-D spatial data of an environment. The apparatus further includes an RF receiver located proximate to the LiDAR scanner that generates time-stamped RF data for an RF transmitter located within the environment. The apparatus further includes a controller that identifies 3-D locations of the scanner within the environment based on the 3-D spatial data, identifies timestamps of the 3-D spatial data that correspond with the 3-D locations, correlates the timestamps of the 3-D spatial data with timestamps of the RF data, and generates a 3-D RF map of the environment based on the correlation. correlates timestamps of the 3-D spatial data with timestamps of the RF data, and generates a 3-D RF map of the environment based on the correlation.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
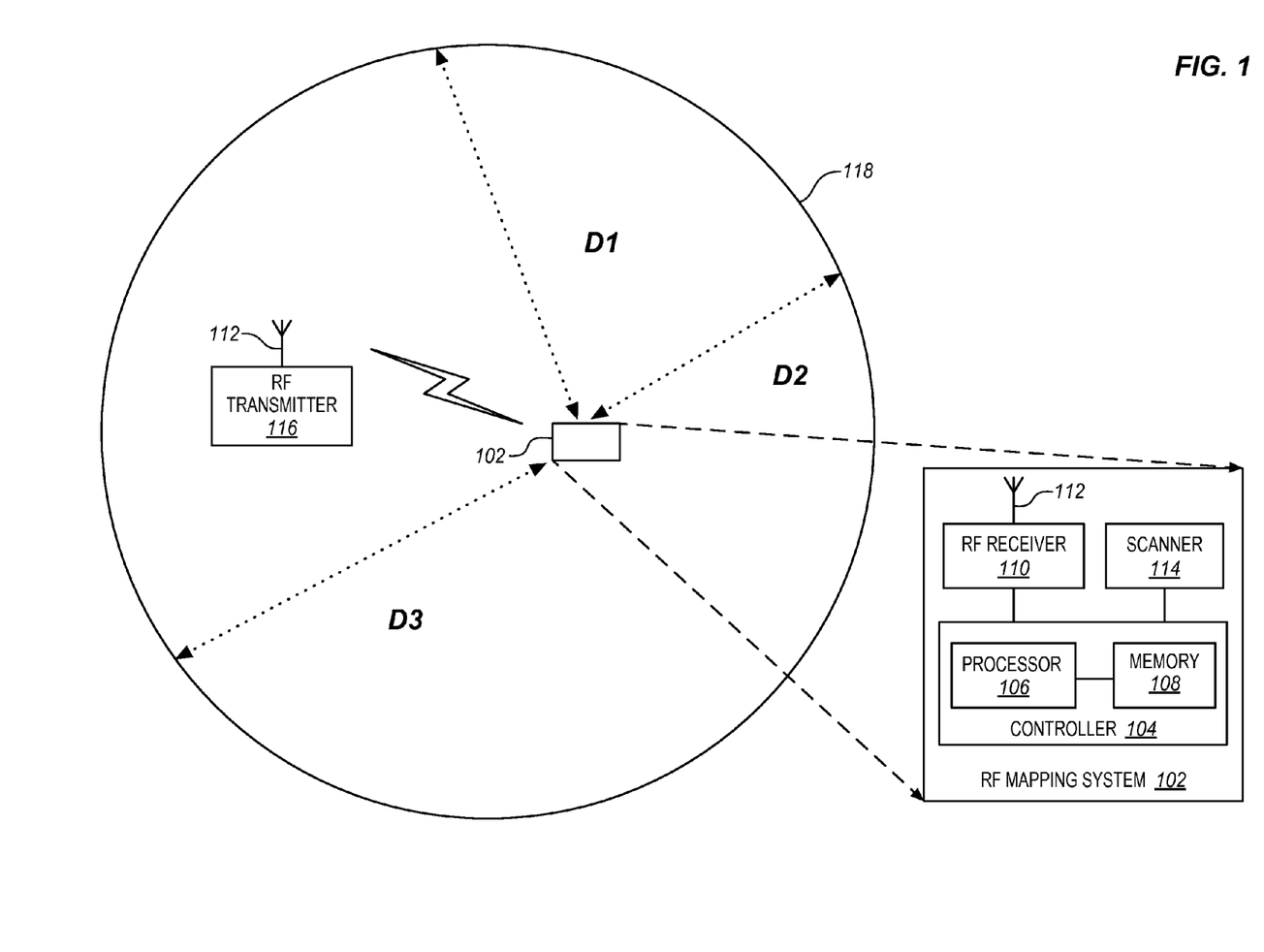
FIG. 1 is a block diagram of an RF mapping system that generates 3-D RF performance maps of an environment in an exemplary embodiment.

FIG. 1 is a block diagram of an RF mapping system 102 that generates 3-D RF performance maps of an environment 118 in an exemplary embodiment. In this embodiment, system 102 is capable of generating spatial data about environment 118 along with RF performance data about environment 118. Environment 118 may be, for example, an interior space of an aircraft. System 102 in this embodiment is a mobile device, and may be carried within environment 118 to gather both spatial data and RF performance data about environment 118. The gathering of spatial data will be discussed first.

As system 102 is moved through environment 118, a scanner 114 generates spatial data about environment 118. For example, if scanner 114 is a LiDAR scanner, then distances D1-D3 from scanner 114 to surfaces within environment 118 may be accurately measured by analyzing reflected light pulses from the surfaces. As system 102 is moved through environment 118, the light pulses create data points that make up the spatial data of environment 118. The motion allows system 102 to generate an accurate 3-D spatial map of environment 118. LiDAR is just one example of a remote sensing technology that may be utilized by scanner 114. Other examples include Radio Detection and Ranging (RADAR) technologies, echo-location technologies, etc. In this embodiment, scanner 114 comprises any system or device that is capable of generating spatial data about environment 118 and therefore, it is not intended that scanner 114 be limited to LiDAR scanners.

As discussed, system 102 is also capable of gathering RF performance data about environment 118 concurrently or substantially concurrently along with the spatial data. As system 102 is moved through environment 118, an RF receiver 110 generates RF performance data about environment 118. For example, RF receiver 110 may receive radio signals (e.g., via an antenna 112) that are generated by one or more transmitters 116 located within environment 118. The radio signals may be analyzed to determine various performance characteristics that change as system 102 moves relative to the location of RF transmitter 116 within environment 118. The performance characteristics may include, for example, RSSI information, Link Quality Information (LQI), polarization information, etc., about transmitter(s) 116

While RF receiver 110 may operate in any RF band as a matter of design choice, some examples of possible RF bands include those designated as Industrial Scientific and Medical (ISM) bands. In this embodiment, RF receiver 110 comprises any system or device that is capable of generating RF performance data about environment 118 and therefore, it is not intended that RF receiver 110 be limited to ISM band radios. In this embodiment, RF receiver 110 is located proximate to scanner 114 to ensure a strong correlation between the RF performance data generated for environment 118 and the location of scanner 114 within environment 118. In some embodiments, RF performance data generated by RF receiver 110 may be adjusted based on a geometric offset between RF receiver 110 and scanner 114. This ensures that the calculated location of scanner 114 within environment 118 is more closely correlated with the RF performance data. For instance, a known geometric relationship or offset between RF receiver 110 and scanner 114 may be used within an RF model to adjust the RF performance data from the measured location (e.g., at RF receiver 110) to a desired location (e.g., more proximate to scanner 114).

In this embodiment, system 102 includes a controller 104 which correlates or analyzes both the spatial data generated by scanner 114 and the RF performance data generated by RF receiver 110 in order to generate 3-D RF performance maps of environment 118. To do so, controller 104 may utilize any system or device that is capable of performing such functionality. While the specific hardware implementation of controller 104 is subject to design choices, one particular embodiment may include one or more processors 106 coupled with a memory 108. Processor 106 includes any hardware device that is able to perform functions. Processor 106 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc.

Memory 108 includes any hardware device that is able to store data. For instance, memory 108 may store spatial data generated by scanner 114, may store RF performance data generated by RF receiver 110, etc., for use by processor 106 in generating 3-D RF performance maps of environment 118. Memory 108 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

For this embodiment, assume that system 102 is a mobile device that is being moved through the interior of environment 118. For example, if environment 118 is an aircraft, then system 102 is moving through the interior of an aircraft. Also assume for this embodiment that one or more RF transmitters 116 are positioned somewhere within the interior of environment 118, and that it is desired to generate a 3-D RF performance map of environment 118. The 3-D RF performance map may be used to measure various RF performance characteristics for RF transmitter(s) 116 within environment 118, allowing for decisions such as whether the particular locations of RF transmitter(s) 116 should be moved or their numbers increased to ensure adequate RF coverage and capability within environment 118.

Figure 2:
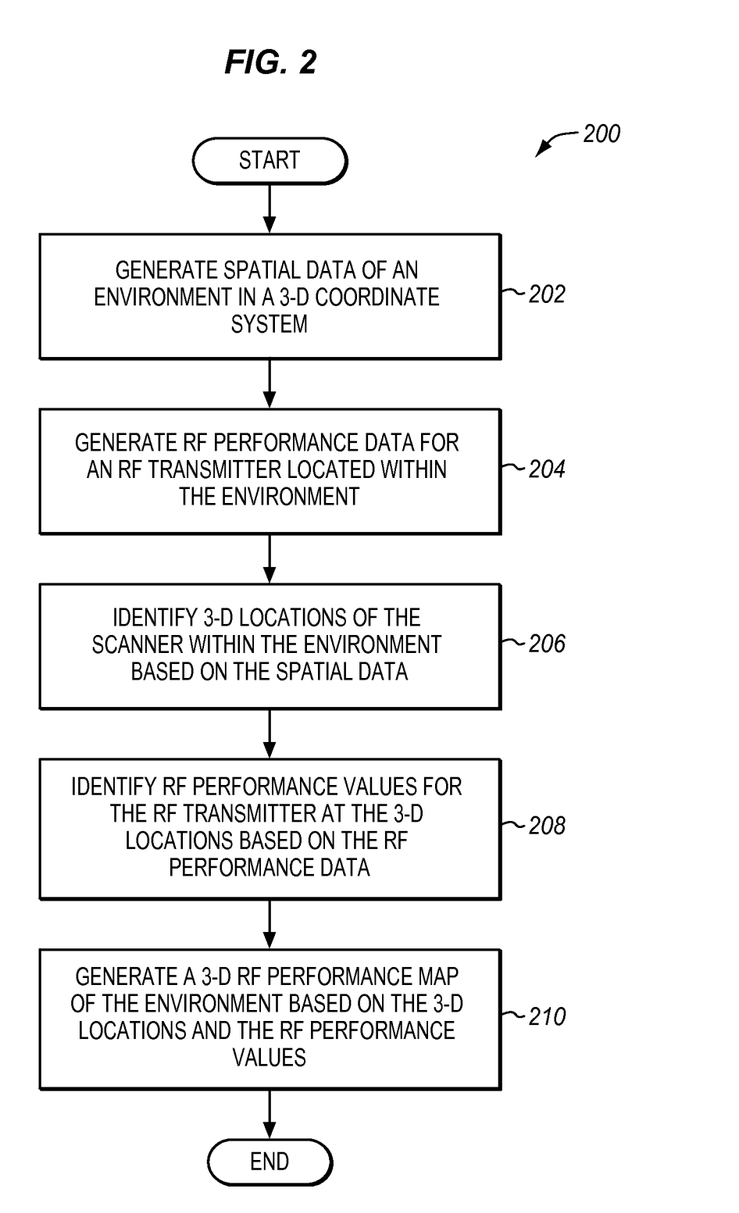
FIG. 2 is a flow chart of a method of generating 3-D RF performance maps of an environment in an exemplary embodiment.

FIG. 2 is a flow chart of a method 200 of generating 3-D RF performance maps of an environment in an exemplary embodiment. The steps of method 200 will be described with reference to FIG. 1, but those skilled in the art will appreciate that method 200 may be performed in other systems. The steps of the flowchart(s) described herein are not all inclusive and may include other steps not shown. The steps described herein may also be performed in an alternative order.

During operation, scanner 114 generates spatial data of environment 118 in a 3-D coordinate system (step 202). For example, scanner 114 may generate some tens of thousands of points of data per second as scanner 114 is moved through environment 118. The data points correspond to distance measurements taken between scanner 114 and any interior features of environment 118. In some cases, an Inertial Measurement Unit (IMU) may be included as part of system 102. The IMU generates movement data which may be used to compensate for the motion of system 102 as it is moved through the interior of environment 118. Using the spatial data generated, the geometry of environment 118 may be identified. The geometry includes various features within environment 118, such as seats in an aircraft, windows, overhead compartments, etc. The spatial data also includes information that can be used to locate system 102 within environment 118 at a particular point in time. For instance, the spatial data may include timestamps, which allows for the identification of which subset of data within the spatial data was generated or captured at a particular moment in time. Since the spatial data may include a number of distance measurements between environment 118 and scanner 114, this may be used to locate scanner 114 relative to the geometry of environment 118 at the timestamp. However, other possibilities exist to locate system 102 within environment 118 from the spatial data. Some examples include data markers, indexes, snapshots, spatial data segment that are stored in different records, etc.

As scanner 114 generates spatial data, RF receiver 110 generates RF performance data for RF transmitter 116 (step 204). One example of RF performance data is RSSI data. RSSI data is indicative of the RF power of a radio signal received from RF transmitter 116, with higher RSSI values indicative of a higher received signal strength for RF transmitter 116, and lower RSSI values indicative of a lower received signal strength for RF transmitter 116. As system 102 moves through environment 118, the RF performance data may change. For example, the RSSI data for RF transmitter 116 may change. In the case of RSSI data, changes may occur due to the proximity of RF receiver 110 to RF transmitter 116, due to RF interference between RF receiver 110 and RF transmitter 116, etc. In the case of RSSI, higher values are better, with values below some threshold indicative of potential communication issues for an RF receiver that is attempting to communicate with RF transmitter 116. Both the spatial data generated by scanner 114 and the RF performance data generated by RF receiver 110 may be stored in memory 108 for use by processor 106. In cases where the RF performance data is RSSI data, the RSSI data generated by RF receiver 110 may be adjusted based on a geometric offset between RF receiver 110 and scanner 114. This ensures that the calculated location of scanner 114 within environment 118 is more closely correlated with the RSSI data. For instance, a known geometric relationship or offset between RF receiver 110 and scanner 114 may be used within an RF model to adjust RSSI data from the measured location (e.g., at RF receiver 110) to a desired location (e.g., more proximate to scanner 114).

Processor 106 identifies 3-D locations of scanner 114 within environment 118 based on the spatial data (step 206). To do so, processor 106 may perform a process referred to a Simultaneous Location and Mapping (SLAM), which attempts to solve the computation problem of constructing or updating a spatial map of an environment (e.g., environment 118) while simultaneously keeping track of an agent's location within in (e.g., a location of system 102 within environment 118). Possible solutions to this type of problem may depend on the type of scanner used to generate the spatial data. Some possible algorithms that may be used to solve this problem include a particle filter and an extended Kalman filter. Different types of scanners give rise to different SLAM algorithms, depending on which algorithms are more appropriate for a particular scanner. In the case of LiDAR scanners, the large number of data points that are generated for an environment can make the SLAM problem easier to solve, since if may be possible to align different segments or snapshots of spatial data generated by LiDAR scanners to various shapes within the environment.

In some cases, processor 106 may analyze a particular segment or snapshot of the spatial data to determine if scanner 114 is located closer to some features within environment 118 than other features. For instance, processor 106 may calculate D1-D3 (see FIG. 1) from the spatial data, which may be used to locate scanner 114 within the 3-D geometry of environment 118. Although FIG. 1 illustrates a 2-D cross section of environment 118, one skilled in the art will understand how a 3-D fix within environment 118 may be calculated based on the 3-D data points that make up the spatial data for environment 118. Processor 106 may also use timestamps within the spatial data to identify the movement of system 102 within environment 118.

Processor 106 identifies RF performance values for RF transmitter 116 at the 3-D locations based on the RF performance data (step 208). If the RF performance data and the spatial data include timestamps, then processor 106 may correlate timestamps in the RF performance data with timestamps in the spatial data to identify RF performance values at the 3-D locations, with a timestamp in the spatial data corresponding to a snapshot of a particular location of scanner 114 within environment 118, and a timestamp in the RF performance data corresponding to a snapshot of a particular RSSI value at the location. Processor 106 may also use other mechanisms to identify RF performance values at the 3-D locations, such as marking, indexing, and/or recording both the spatial data and the RF performance data in similar ways as they are both generated. If the RF performance data is RSSI data, then a similar timestamp correlation process may occur. Processor 106 may also use other mechanisms to identify RSSI values at the 3-D locations, such as marking, indexing, and/or recording both the spatial data and the RSSI data in similar ways as they are both generated.

Utilizing the 3-D locations of scanner 114 within environment 118, and utilizing the RF values for RF transmitter 116 identified at the 3-D locations, processor 106 generates a 3-D RF performance map of environment 118 (step 210). The 3-D RF performance map of environment 118 may be used to quickly and efficiently determine if possible RF communications issues are present at different locations within environment 118. For example, if environment 118 is the interior an aircraft, then system 102 could be used to generate a 3-D RF performance map (e.g., a 3-D RSSI map) of the interior nearly as fast as the time it takes to move system 102 along the isles, seats, compartments, etc., of the aircraft. The 3-D RF performance map may be a data file in some embodiments that could be imported into a 3-D Computer Aided Design (CAD) system for further review. In other embodiments, processor 106 may display the 3-D RF performance map in real-time or near real-time on a display of system 102 (not shown) to provide an operator of system 102 rapid feedback of any possible RF issues that may be present in environment 118.

Figure 3:
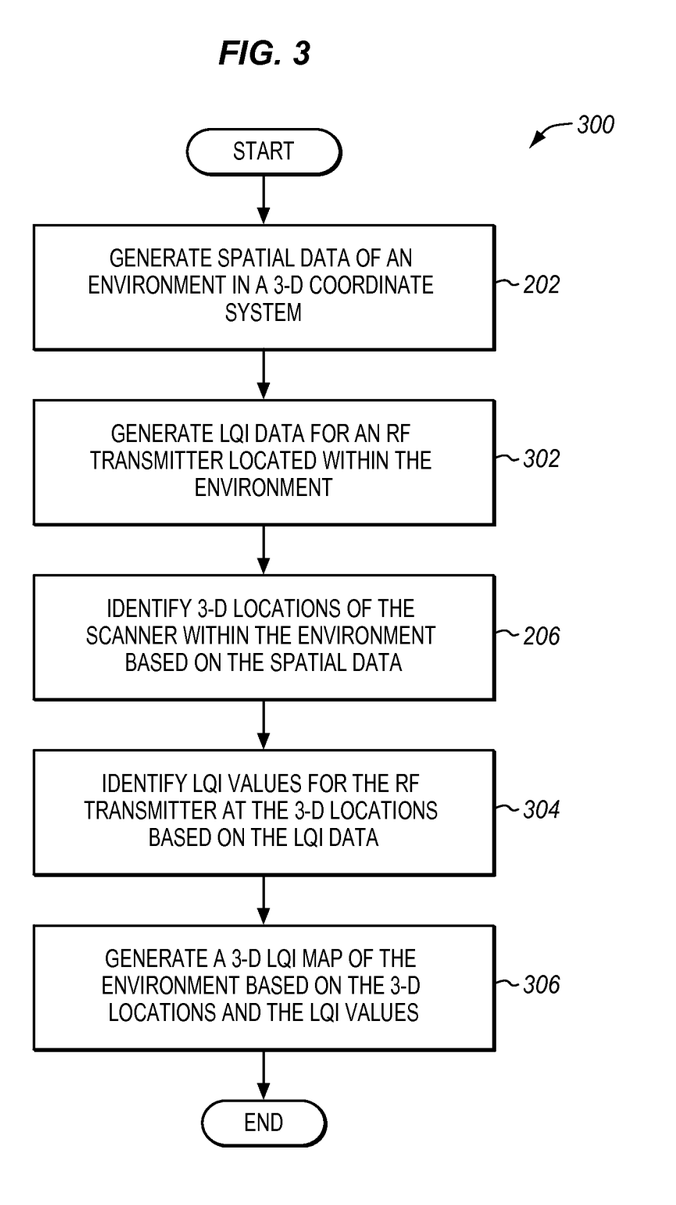
FIG. 3 is a flow chart of a method of generating 3-D Link Quality Indication (LQI) maps of an environment in an exemplary embodiment.

In some embodiments, system 102 may be utilized to generate 3-D LQI maps of environment 118. LQI is a RF performance indicator that takes into account both the received signal strength from an RF transmitter (e.g., RF transmitter 116) and the number of errors received. For example, it is possible to have a high RSSI with a large number of errors, which would translate into a low LQI. Thus, it may be desirable to further identify possible LQI issues within environment 118. FIG. 3 is a flow chart of a method 300 of generating 3-D LQI maps of an environment in an exemplary embodiment. The steps of method 300 will be described with reference to FIG. 1, but those skilled in the art will appreciate that method 300 may be performed in other systems.

Scanner 114 generates spatial data of environment 118 in a 3-D coordinate system (see step 202 of FIG. 2). This step has been previously described with respect to method 200. RF receiver 110 generates LQI data for RF transmitter 116 (step 302). The LQI data is a calculated value that may be based on the RSSI (or some other signal strength metric for RF transmitter 116) and the number of errors received over the RF link between RF transmitter 116 and RF receiver 110. The LQI is indicative of how easily a received signal can be demodulated or decoded. Low LQI values indicate a better link than high values, with LQI values above some threshold indicative of potential communication issues for an RF receiver that is attempting to communicate with RF transmitter 116. There are a number of corner cases which illustrate how RSSI and LQI work together to identify the RF performance of an RF link between RF receiver 110 and RF transmitter 116:

A weak signal in the presence of noise may result in a low RSSI and a high LQI. A weak signal in the absence of noise may result in a low RSSI and a low LQI. Strong noise (e.g., from a nearby RF source in the RF band under test) may result in a high RSSI and a high LQI. A strong signal with low noise may result in a high RSSI and a low LQI. A very strong signal that causes RF receiver 110 to saturate may result in a high RSSI and a high LQI. In some embodiments, LQI data generated by RF receiver 110 may be adjusted based on a geometric offset between RF receiver 110 and scanner 114. This ensures that the calculated location of scanner 114 within environment 118 is more closely correlated with the LQI data. For instance, a known geometric relationship or offset between RF receiver 110 and scanner 114 may be used within an RF model to adjust LQI data from the measured location (e.g., at RF receiver 110) to a desired location (e.g., more proximate to scanner 114).

Processor 106 identifies 3-D locations of scanner 114 within environment 118 based on the spatial data (see step 206 of FIG. 2). This step has been previously described with respect to method 200. Processor 106 may then identify LQI values for RF transmitter 116 at the 3-D locations based on the LQI data (step 304). When the LQI data and the spatial data include timestamps, processor 106 may correlate timestamps in the LQI data with timestamps in the spatial data to identify LQI values at the 3-D locations, with a timestamp in the spatial data corresponding to a snapshot of a particular location of scanner 114 within environment 118, and a timestamp in the LQI data corresponding to a snapshot of a particular LQI value at the location. Processor 106 may also use other mechanisms to identify LQI values at the 3-D locations, such as marking, indexing, and/or recording both the spatial data and the LQI data in similar ways as they are both generated.

Utilizing the 3-D locations of scanner 114 within environment 118, and utilizing the LQI values for RF transmitter 116 identified at the 3-D locations, processor 106 generates a 3-D LQI map of environment 118 (step 306). The 3-D LQI map of environment 118 may be used to quickly and efficiently determine if possible RF communications issues are present at different locations within environment 118. For example, if environment 118 is the interior an aircraft, then system 102 could be used to generate a 3-D LQI map of the interior nearly as fast as the time it takes to move system 102 along the isles, seats, compartments, etc., of the aircraft. The 3-D LQI map may be a data file in some embodiments that could be imported into a 3-D CAD system for further review. In other embodiments, processor 106 may display the 3-D LQI map in real-time or near real-time on a display of system 102 (not shown) to provide an operator of system 102 rapid feedback of any possible RF issues that may be present in environment 118.

Figure 4:
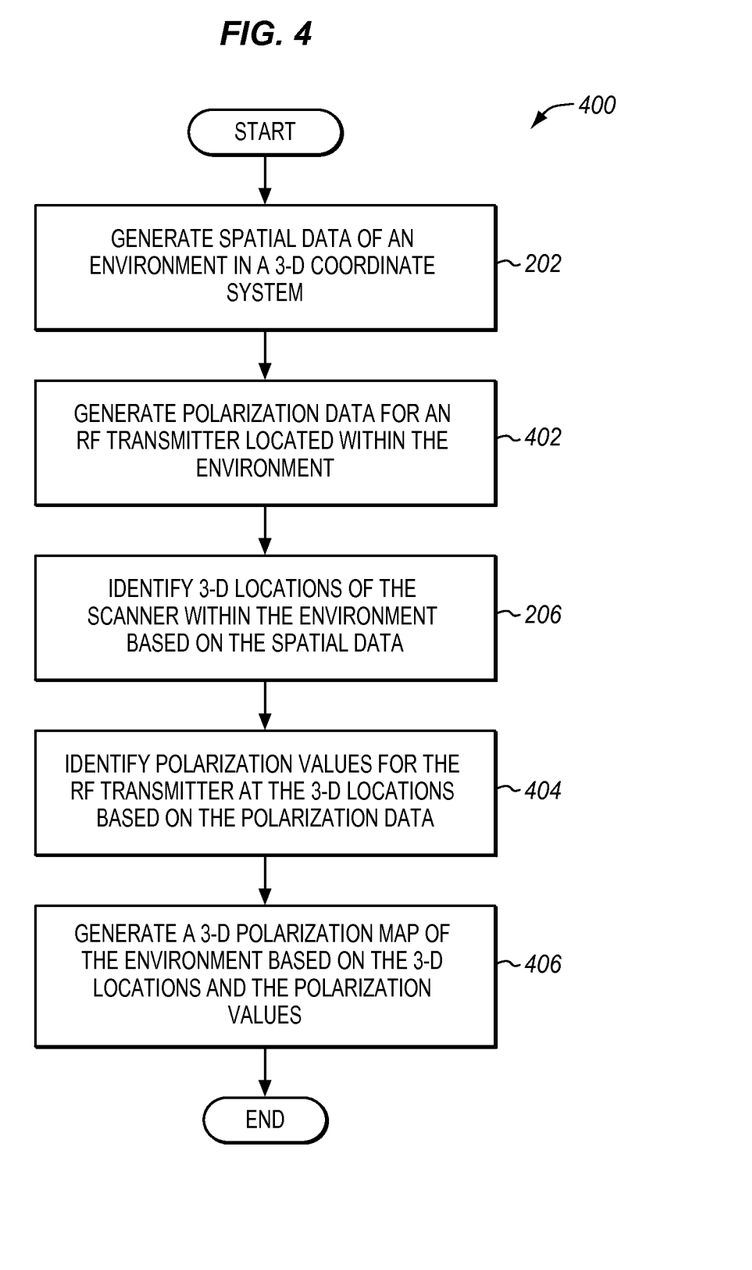
FIG. 4 is a flow chart of a method of generating 3-D polarization maps of an environment in an exemplary embodiment.

In some embodiments, system 102 may be utilized to generate 3-D polarization maps of environment 118. Polarization is a RF indicator that refers to the plane in which the electric field vibrates. Matching the polarization of antenna of a receiver (e.g., antenna 112 of RF receiver 110) maximizes the received signal and therefore, it may be possible to improve the RF performance within environment 118 using knowledge about the polarization of RF transmitter 116. FIG. 4 is a flow chart of a method 400 of generating 3-D polarization maps of an environment in an exemplary embodiment. The steps of method 400 will be described with reference to FIG. 1, but those skilled in the art will appreciate that method 400 may be performed in other systems.

Scanner 114 generates spatial data of environment 118 in a 3-D coordinate system (see step 202 of FIG. 2). This step has been previously described with respect to method 200. RF receiver 110 generates polarization data for RF transmitter 116 (step 402). The polarization data may depend upon the orientation of antenna 112 as system 102 travels through environment 118. Thus, orientation data for system 102 may be used to determine the orientation of antenna 112, if adjustments of the polarization data are warranted. In some embodiments, polarization data generated by RF receiver 110 may be adjusted based on a geometric offset between RF receiver 110 and scanner 114. This ensures that the calculated location of scanner 114 within environment 118 is more closely correlated with the polarization data. For instance, a known geometric relationship or offset between RF receiver 110 and scanner 114 may be used within an RF model to adjust polarization data from the measured location (e.g., at RF receiver 110) to a desired location (e.g., more proximate to scanner 114).

Processor 106 identifies 3-D locations of scanner 114 within environment 118 based on the spatial data (see step 206 of FIG. 2). This step has been previously described with respect to method 200. Processor 106 may then identify polarization values for RF transmitter 116 at the 3-D locations based on the polarization data (step 404). When the polarization data and the spatial data include timestamps, then processor 106 may correlate timestamps in the polarization data with timestamps in the spatial data to identify polarization values at the 3-D locations, with a timestamp in the spatial data corresponding to a snapshot of a particular location of scanner 114 within environment 118, and a timestamp in the polarization data corresponding to a snapshot of a particular polarization value at the location. Processor 106 may also use other mechanisms to identify polarization values at the 3-D locations, such as marking, indexing, and/or recording both the spatial data and the polarization data in similar ways as they are both generated.

Utilizing the 3-D locations of scanner 114 within environment 118, and utilizing the polarization values for RF transmitter 116 identified at the 3-D locations, processor 106 generates a 3-D polarization map of environment 118 (step 406). The 3-D polarization map of environment 118 may be used to quickly and efficiently determine if possible RF communications issues are present at different locations within environment 118. For example, if environment 118 is the interior an aircraft, then system 102 could be used to generate a 3-D polarization map of the interior nearly as fast as the time it takes to move system 102 along the isles, seats, compartments, etc., of the aircraft. The 3-D polarization map may be a data file in some embodiments that could be imported into a 3-D CAD system for further review. In other embodiments, processor 106 may display the 3-D polarization map in real-time or near real-time on a display of system 102 (not shown) to provide an operator of system 102 rapid feedback of any possible RF issues that may be present in environment 118.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a scanner configured to generate spatial data of an environment in a 3-Dimensional (3-D) coordinate system as the apparatus is moved through the environment;
a Radio Frequency (RF) receiver located proximate to the scanner that is configured to generate RF performance data for an RF transmitter located within the environment as the apparatus is moved through the environment; and
a controller configured to identify 3-D locations of the scanner within the environment based on the spatial data generated as the apparatus is moved through the environment, to identify RF performance values for the RF transmitter at the 3-D locations based on the RF performance data generated as the apparatus is moved through the environment, and to generate a 3-D RF performance map of the environment based on the 3-D locations and the RF performance values.

2. The apparatus of claim 1 wherein:
the scanner comprises a Light Detection and Ranging (LiDAR) scanner.

3. The apparatus of claim 1 wherein:
the RF receiver is configured to generate Received Signal Strength Indicator (RSSI) data for the RF transmitter; and
the controller is configured to identify RSSI values for the RF transmitter at the 3-D locations based on the RSSI data, and to generate a 3-D RSSI map of the environment based on the 3-D locations and the RSSI values.

4. The apparatus of claim 3 wherein:
the controller is configured to adjust the RSSI data based on a geometric offset between the RF receiver and the scanner.

5. The apparatus of claim 1 wherein:
the RF receiver is configured to generate Link Quality Indication (LQI) data for the RF transmitter; and
the controller is configured to identify LQI values for the RF transmitter at the 3-D locations based on the LQI data, and to generate a 3-D LQI map of the environment based on the 3-D locations and the LQI values.

6. The apparatus of claim 5 wherein:
the controller is configured to adjust the LQI data based on a geometric offset between the RF receiver and the scanner.

7. The apparatus of claim 1 wherein:
the RF receiver is configured to generate polarization data for the RF transmitter; and
the controller is configured to identify polarization values for the RF transmitter at the 3-D locations from the polarization data, and to generate a 3-D polarization map of the environment based on the 3-D locations and the polarization values.

8. The apparatus of claim 7 wherein:
the controller is configured to adjust the polarization data based on a geometric offset between the RF receiver and the scanner.

9. The apparatus of claim 1 wherein:
the controller is configured to identify timestamps in the spatial data, to analyze the spatial data captured at the timestamps to identify locations of the scanner relative to the environment, to identify timestamps in the RF performance data, and to correlate timestamps in the spatial data to timestamps in the RF performance data to identify the RF performance values.

10. A method comprising:
generating, by a scanner, spatial data of an environment in a 3-Dimensional (3-D) coordinate system as the scanner is moved through the environment;
generating, by a Radio Frequency (RF) receiver located proximate to the scanner, RF performance data for an RF transmitter located within the environment as the RF receiver is moved through the environment;
identifying 3-D locations of the scanner within the environment based on the spatial data generated as the scanner is moved through the environment;
identifying RF performance values for the RF transmitter at the 3-D locations based on the RF performance data generated as the RF receiver is moved through the environment; and
generating a 3-D RF performance map of the environment based on the 3-D locations and the RF performance values.

11. The method of claim 10 wherein:
generating, by a scanner, spatial data comprises:
generating, by a Light Detection and Ranging (LiDAR) scanner, the spatial data.

12. The method of claim 10 wherein:
generating the RF performance data comprises:
generating Received Signal Strength Indicator (RSSI) data for the RF transmitter;
identifying the RF performance values comprises:
identifying RSSI values for the RF transmitter at the 3-D locations based on the RSSI data; and
generating the 3-D RF performance map comprises:
generating a 3-D RSSI map of the environment based on the 3-D locations and the RSSI values.

13. The method of claim 12 further comprising:
adjusting the RSSI data based on a geometric offset between the RF receiver and the scanner.

14. The method of claim 10 wherein:
generating the RF performance data comprises:
generating Link Quality Indication (LQI) data for the RF transmitter;
identifying the RF performance values comprises:
identifying LQI values for the RF transmitter at the 3-D locations based on the LQI data; and
generating the 3-D RF performance map comprises:
generating a 3-D LQI map of the environment based on the 3-D locations and the LQI values.

15. The method of claim 14 further comprising:
adjusting the LQI data based on a geometric offset between the RF receiver and the scanner.

16. The method of claim 10 wherein:
generating the RF performance data comprises:
generating polarization data for the RF transmitter;
identifying the RF performance values comprises:
identifying polarization values for the RF transmitter at the 3-D locations based on the polarization data; and
generating the 3-D RF performance map comprises:
generating a 3-D polarization map of the environment based on the 3-D locations and the polarization values.

17. The method of claim 16 further comprising:
adjusting the polarization data based on a geometric offset between the RF receiver and the scanner.

18. The method of claim 10 wherein:
identifying 3-D locations of the scanner in the environment further comprises:
identifying timestamps in the spatial data; and
analyzing the spatial data captured at the timestamps to identify locations of the scanner relative to the environment; and identifying RF performance values for the RF transmitter at the 3-D locations further comprises:
identifying timestamps in the RF performance data; and
correlating timestamps in the 3-D spatial data to timestamps in the RF performance data to identify the RF performance values.

19. An apparatus comprising:
a Light Detection and Ranging (LiDAR) scanner configured to generate time-stamped 3-Dimensional (3-D) spatial data of an environment;
a Radio Frequency (RF) receiver located proximate to the LiDAR scanner that is configured to generate time-stamped RF data for an RF transmitter located within the environment; and
a controller configured to identify 3-D locations of the scanner within the environment based on the 3-D spatial data, to identify timestamps of the 3-D spatial data that correspond with the 3-D locations, to correlate the timestamps of the 3-D spatial data with timestamps of the RF data, and to generate a 3-D RF map of the environment based on the correlation.

20. The apparatus of claim 19 wherein:
the RF data comprises Received Signal Strength Indicator (RSSI) data; and
the controller is configured to correlate the timestamps of the 3-D spatial data with the timestamps of the RSSI data, and to generate a 3-D RSSI map of the environment based on the correlation.

21. The apparatus of claim 19 wherein:
the RF data comprises Link Quality Indication (LQI) data; and
the controller is configured to correlate the timestamps of the 3-D spatial data with the timestamps of the LQI data, and to generate a 3-D LQI map of the environment based on the correlation.

22. The apparatus of claim 19 wherein:
the RF data comprises polarization data; and
the controller is configured to correlate the timestamps of the 3-D spatial data with the timestamps of the polarization data, and to generate a 3-D polarization map of the environment based on the correlation.

* * * * *